Sept. 8, 1953  A. ASHMAN  2,651,364
METHOD OF AND APPARATUS FOR CUTTING PAPER AND LIKE WEBS
Filed June 24, 1950  2 Sheets-Sheet 1
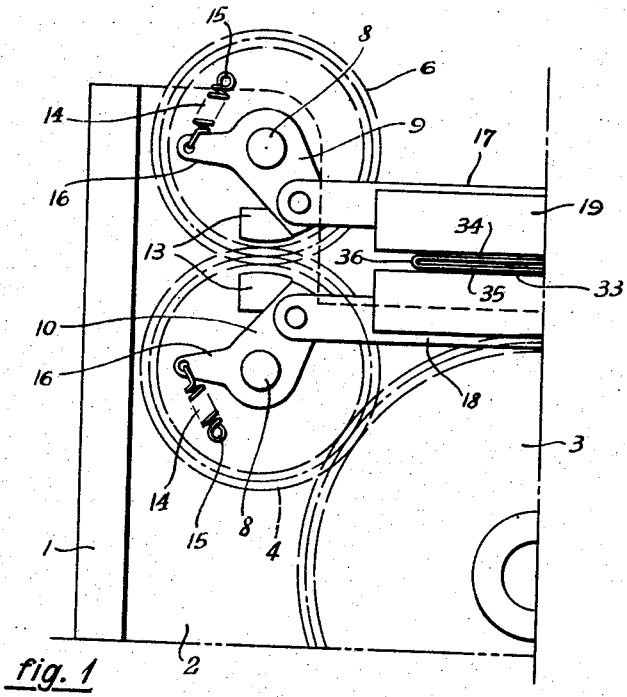
fig. 1
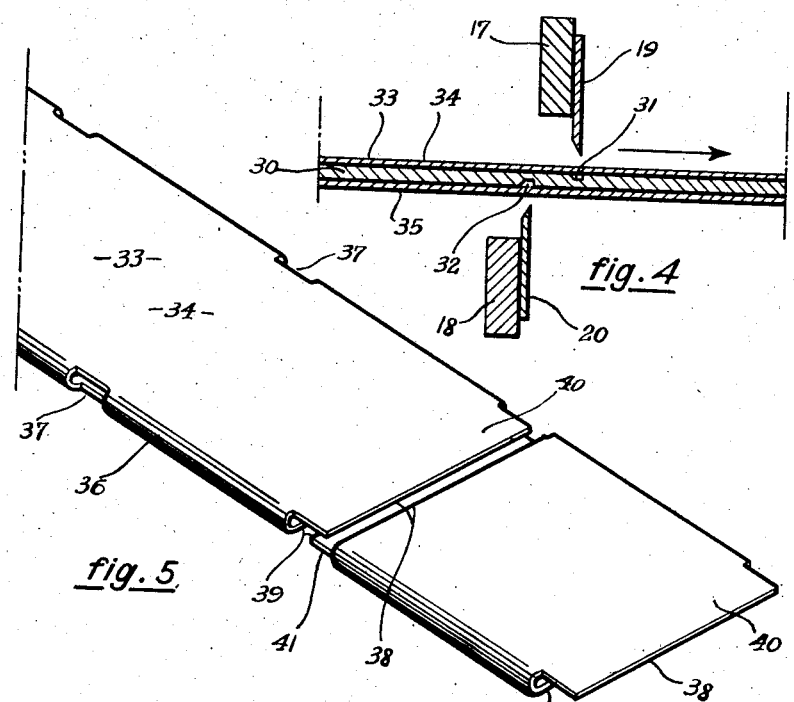
fig. 4
fig. 5
Arthur Ashman
Fraser, Myers Manley
Attys.

Sept. 8, 1953                    A. ASHMAN                    2,651,364
           METHOD OF AND APPARATUS FOR CUTTING PAPER AND LIKE WEBS
Filed June 24, 1950                                    2 Sheets-Sheet 2

By Arthur Ashman
Fraser, Myers & Manley
Attys.

Patented Sept. 8, 1953

2,651,364

UNITED STATES PATENT OFFICE 2,651,364

METHOD OF AND APPARATUS FOR CUTTING PAPER AND LIKE WEBS

Arthur Ashman, Bristol, England, assignor to Colodense Limited, Bristol, England, a company of Great Britain and Northern Ireland Application June 24, 1950, Serial No. 170,065
In Great Britain March 9, 1950

7 Claims. (Cl. 164—17)

1

This invention relates to a method of and apparatus for cutting paper and like webs, including webs of cellulosic material.

In the manufacture of bags from webs of paper or plastic films it is usual to employ a rotary cutter to cut the web up into lengths from which individual bags are formed. This sometimes results in the web being torn. In the case of a tubular web the disadvantage of a rotary cutter is that both sides of the web are cut through together and an irregular top and bottom cannot be formed in one operation.

Method of cutting paper and like webs into lengths according to this invention comprises continuously feeding the web forward and cutting the web with a straight line cutter.

Preferably according to this invention two straight line cutters are used which result in being able to cut the back and the front of the tube in stepped formation, in other words, one cutter is in front of the other. Preferably the straight line cutters are released into operation by a trigger action so that the cutters move with great speed and do not interfere with the progress of the tube.

The tubing arrangements are of the normal type, the tube being formed around a former plate. This passes through the draw rollers to the cutting device in the normal manner. The former plate has a narrow groove on the bottom side and on the top side. These grooves are in predetermined positions ready to receive the cutting blade on the cutting mechanism.

The position of the groove in the former plate can be varied within certain limits so as to vary the length of the lip on the tube after cutting. The knives are operated both at the top and at the bottom by a gear mechanism and the blades on the downward and upward strokes are delayed by a cam mechanism within a very small distance from the former plate.

At a predetermined moment a release mechanism operates and the cutting blades continue their upward and downward movement and at the same time, move rapidly across the former plate penetrating the grooves in the former plate and thereby severing the tube on both sides of the former plate. The blades then continue their movement ready for a repeat performance which operates with each tube served.

The tube then goes through the normal operation for pasting and bottoming to make the complete bag.

One form of the invention is illustrated in the accompanying drawings, wherein:

Fig. 1 is an elevation of part of the apparatus;

2

Fig. 4 is a section on lines IV—IV, Fig. 2; and

Fig. 5 is a perspective view of part of a bag tube showing how the bag lengths are cut.

Figure 2:
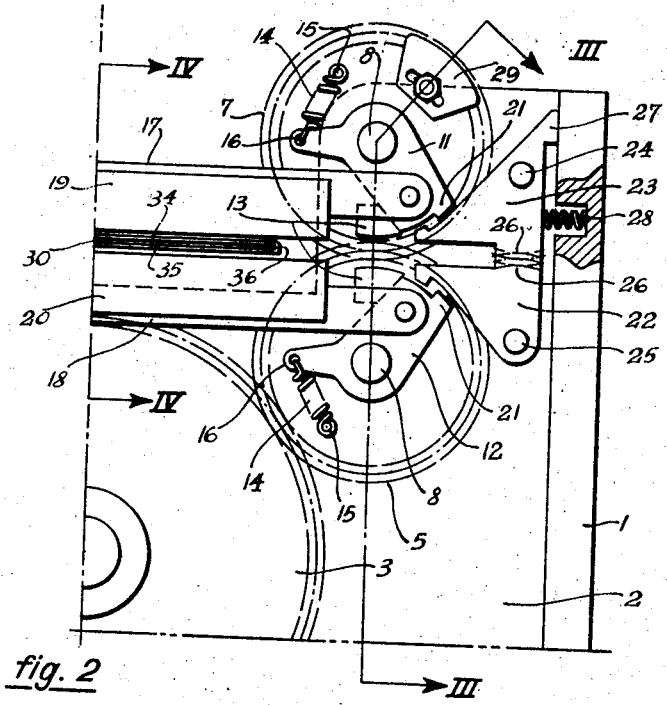
Fig. 2 is an elevation of the other part thereof.
Figure 3:
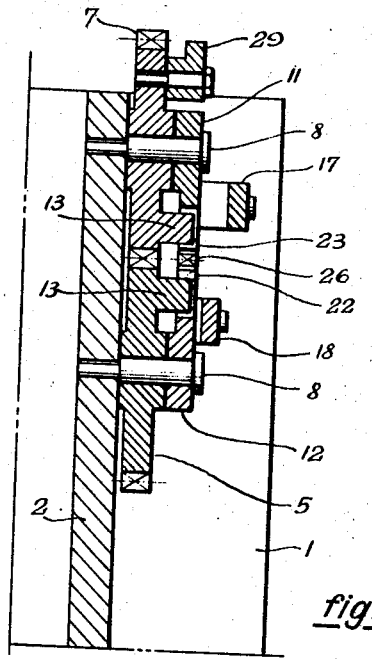
Fig. 3 is a section on lines III—III, Fig. 2.

Referring to the drawings, there is provided frame members 1, 1 having a partition 2 which serves as bearing for a driving gear wheel 3 which meshes with the driven gear wheels 4 and 5 which, in turn, mesh with the gears 6 and 7 respectively. Each of the gears 4, 5, 6 and 7 are freely rotatable on axles 8 which also serve as pivot pins for cranks 9 and 10 in respect of the gear wheels 4 and 6 and cranks 11 and 12 in respect of the gear wheels 5 and 7. Springs 14 are provided in respect of each of the gears 4 to 7, each spring 14 being secured at one end to a pin 15 on the gear wheel and the other end in each case is secured to an extension 16 of the cranks 9 to 12. A stop lug 13 is provided on each of the gears 4 to 7 to form an abutment against which the respective cranks 9 to 12 are held by the springs 14. The gear wheels 4 and 5 are adapted to rotate in a counterclockwise sense and the gear wheels 6 and 7 in a clockwise sense (see Fig. 1) and it will be seen that their motion is transmitted to the respective cranks 9 to 12 through the intermediary of the springs 14. The cranks 9 and 11 are connected by a connecting rod 17 and the cranks 10 and 12 are similarly connected by a connecting rod 18. The cranks 9 to 12 are so mounted on the gears through the pins 15 and springs 16 that the connecting rods 17 and 18 maintain their parallel relation as the cranks are rotated by the gears. Each of the connecting rods 17 and 18 carry knife blades 19 and 20 respectively, whose cutting edges oppose one another but in staggered relationship (see Fig. 2). The cranks 11 and 12 are each provided with an extension 21. The latches 22 and 23 are pivoted to the frame 1 at 24 and 25 and are connected together by gear segments 26 whereby both latches 22 and 23 are caused to move in unison about their respective pivots. The latch 23 is urged by a spring 28 against a stop 27, the action of spring 28 being also transmitted to the latch 22 through the medium of the gear segments 26. An adjustable cam 29 is secured to the side of the gear wheel 7, the said cam 29 being so positioned as to pivot the latches 22 and 23 against spring 28 during rotation of the gear wheel 7. A former plate 30 extends between the blades 19 and 20 and is provided with recesses 31 and 32 which extend transversely the whole width of the former plate 30. A tube 33 is formed from a web of paper or cellulosic film (not shown) in its passage over the former plate 30 prior to being cut into bag lengths by the mechanism according to this invention.

The tube 33 comprises upper and lower webs 34 and 35 respectively and the sides 36.

In operation the tube 33 is forwarded along former plate 30 by the known method of forwarding rollers and prior to reaching the apparatus illustrated in the drawings, the sides 36 of tube 33 are cut away so as to form recesses 37 at intervals conforming to the length of bag to be cut.

Continuous rotary motion is imparted to the gears 4 to 7 by the driving gear 3, and the springs 14 on gears 4 to 7 transmit that motion to the cranks 9 to 12 which, in turn, impart their motion to the connecting rods 17 and 18 and thereby to the knife blades 19 and 20 which, consequently, move through a circular path whilst remaining in parallelism with the former plate 30 and approach the latter to cut the bag tube 33 at regular intervals. Shortly before the cutting edges of the knife blades 19 and 20 make contact with the bag tube 33 the extension 21 of the cranks 11 and 12 abut the latches 22 and 23 and stop in that position whilst the gears 4 to 7 continue to rotate, the stops 13 moving away from the cranks. After a predetermined interval of time, the cam 29 makes contact with the latch 23 and disengages the latter from the extension 21 of the crank 11. Simultaneously, the latch 22 disengages from the crank 12 since both latches co-act through the gear segments 26. During the period of engagement of the cranks 11 and 12 with the latches 22 and 23, the springs 14 are being extended by the continued motion of the gears 4 to 7, and when the cam 29 disengages the cranks, the latter make a rapid traverse in an arcuate path under the action of the springs 14 in the manner of a trigger, said rapid traverse being terminated by stops 13.

The period of rapid traverse is timed to commence just before the knife blades 19 and 20 enter the bag tube 33 on their circular paths and to continue until the knives are again clear of the bag tube, and during that period the speed of movement of the knives is sufficiently high not to interfere with the movement of the bag tube, and in this manner a clean cut is produced. To ensure a proper penetration of the bag tube, the knives enter partially into the recesses 31 and 32 of former plate 30.

The cuts made by the knives take place in staggered relationship, a cut 38 being made by the knife 19 in the upper web 34 of the bag tube 33 and a cut 39 being made in the lower web 35, whereby lips 40 and 41 are formed on the bag. The recesses 37 in the sides of the bag tube ensure the proper separation of the adjacent lips 40 and 41.

The movement of the knives is timed with the forwarding movement of the bag tube and the operation of cutting lipped bag lengths is continuous.

What I claim and desire to secure by Letters Patent is:

1. The method of cutting substantially flat, tubular stock of paper and the like into predetermined lengths with the ends of the superposed webs of the tubular stock in offset relation, comprising the steps of continuously feeding the tubular stock in the direction of its length and cutting through the respective superposed webs of tubular stock at longitudinally spaced apart lines transverse to the direction of feed by a cutting edge movable simultaneously both transversely across and perpendicularly through said web to provide projecting lips alternately on the respective webs at the opposite ends of the cut lengths of stock.

2. The method of claim 1 wherein the transverse cutting of the stock along spaced apart lines is simultaneously performed.

3. Apparatus for cutting into predetermined lengths, flat, tubular stock of paper and the like, comprising a substantially flat plate over which the tubular stock is fed, a pair of cutters disposed transversely to the plate, one on either face thereof, and spaced one in advance of the other in the direction of feed of the stock, said plate having transverse grooves in the faces thereof to accommodate the cutting edges of the cutters and means for operating said cutters to impart thereto a simultaneous movement both transversely across and perpendicularly through said web so that each cutter will cut through only one of the webs of the stock.

4. Apparatus according to claim 3 wherein the means for operating the cutters impart to each of the cutters an arcuate movement and comprises means for intermittently stopping the arcuate movement of the cutter as it approaches the cutting stroke, and means for imparting to the cutter a cutting stroke faster than the normal arcuate movement of the cutter.

5. Apparatus according to claim 3 wherein each cutter is a straight knife, a pair of cranks supporting each knife, and said cranks being mounted to impart to the cutters arcuate movements while maintaining the cutters in parallel relation.

6. Apparatus for cutting into predetermined lengths, a web of paper and the like, comprising a plate over which the web is fed, a knife blade mounted to move transversely to the plate, a pair of cranks supporting the knife, means for rotating the cranks for imparting to the knife movement in an arcuate path across the plate, means for arresting movement of the knife as it approaches the cutting stroke, and means for imparting to the cutter a cutting stroke faster than the normal movement of the cutter.

7. Apparatus according to claim 6 wherein the means for rotating the cranks comprises a driven gear on the shaft of which the crank is loosely mounted, spring means connecting said gear and crank for driving the crank, latching means for intermittently arresting movement of the crank as the cutter approaches the cutting stroke while permitting rotative movement of the gear, thus subjecting the spring to increased tension, and a cam carried by the gear for disengaging the latching means to release the crank, whereby the tensioned spring operates to impart to the crank and to the cutter carried thereby the faster cutting stroke.

ARTHUR ASHMAN.

References Cited in the file of this patent

UNITED STATES PATENTS

| Number | Name | Date |
| --- | --- | --- |
| 861,267 | Cooper | July 30, 1907 |
| 1,009,028 | Brown | Nov. 14, 1911 |
| 1,075,836 | Lorenz | Oct. 14, 1913 |
| 2,099,314 | Potdevin | Nov. 16, 1937 |
| 2,182,002 | Potdevin | Dec. 5, 1939 |
| 2,311,692 | Potdevin | Feb. 23, 1943 |